United States Patent [19]

Leiber

[11] 4,408,673

[45] Oct. 11, 1983

[54] SPEED-CONTROLLED SERVO-ASSISTED STEERING APPARATUS

[75] Inventor: Heinz Leiber, Leimen, Fed. Rep. of Germany

[73] Assignee: Robert Bosch GmbH, Stuttgart, Fed. Rep. of Germany

[21] Appl. No.: 278,246

[22] Filed: Jun. 29, 1981

Related U.S. Application Data

[63] Continuation of Ser. No. 59,354, Jul. 20, 1979, abandoned.

[30] Foreign Application Priority Data

Sep. 1, 1978 [DE] Fed. Rep. of Germany ....... 2838152

[51] Int. Cl.³ .............................................. B62D 5/06
[52] U.S. Cl. .................................... 180/141; 180/148
[58] Field of Search ............... 180/143, 142, 141, 140, 180/148, 159, 132, 79.1

[56] References Cited

U.S. PATENT DOCUMENTS

| | | | |
|---|---|---|---|
| 2,299,199 | 10/1942 | Wood et al. ................... | 180/79.1 X |
| 2,487,618 | 11/1949 | Twyman ............................. | 180/143 |
| 3,572,744 | 3/1971 | Smith .................................. | 280/90 |
| 3,718,332 | 2/1973 | Jones .................................. | 280/735 |
| 3,881,567 | 5/1975 | Leiber ................................. | 180/142 |
| 4,175,638 | 11/1979 | Christensen ..................... | 180/79.1 X |
| 4,176,728 | 12/1979 | Otteblad .......................... | 180/79.1 |
| 4,349,079 | 9/1982 | Leiber ............................. | 180/132 X |

*Primary Examiner*—John A. Pekar
*Attorney, Agent, or Firm*—Edwin E. Greigg

[57] ABSTRACT

A servo-assisted power steering means is proposed in which one of the two track rod joints of the steered wheels is embodied as a linear force transducer. An electric or electronic switch is disposed in the tie rod or in the steering knuckle assembly and furnishes switching signals to an electric or electronic control device. These signals are then processed and supplied to a servo apparatus in order to reinforce the movement of the tie rod initiated by the driver via the steering wheel. The control device is part of a brake anti-lock apparatus, wherein the data pertaining to velocity which are required there are also used in the power steering in such a manner that the auxiliary force is switched on only in a low vehicle velocity range, so as to serve, for example, as an aid in parking of the motor vehicle.

11 Claims, 2 Drawing Figures

SPEED-CONTROLLED SERVO-ASSISTED STEERING APPARATUS

CROSS REFERENCE TO RELATED COPENDING APPLICATIONS AND TO PRIOR ART DATA

This application is a continuation of application Ser. No. 59,354 filed July 20, 1979, now abandoned.

There are no patents or printed publications having a bearing on the patentability of the present invention, but of some interest are the following:

Heinz Leiber application Ser. No. 62,600 filed July 31, 1979, now abandoned.

Heinz Leiber application Ser. No. 62,595 filed July 31, 1979, now abandoned.

German Offenlegungsschrift No. 2,352,018.

Heinz Leiber U.S. Pat. No. 3,881,567 issued May 6, 1975.

Heinz Leiber U.S. Pat. No. 4,141,595 issued Feb. 20, 1979.

Heinz Leiber U.S. Pat. No. 4,143,514 issued Mar. 13, 1979.

None of these above and several references, whether taken and viewed singly or in combination with each other, are believed to have a bearing on the patentability of any claim of this invention. Transducer sensors such as known Hall or piezoelectric transducer sensors of Jones U.S. Pat. No. 3,718,332 and multiple-position valves and anti-locking brake apparatus in a common housing such as known in my U.S. Pat. No. 4,141,595 and 4,143,514, are incorporated hereby by reference.

BACKGROUND OF THE INVENTION

The invention relates to a servo-assisted power steering system as disclosed herein and finally claimed. Servo-assisted power steering means of this general type often have rotary torque transducers which are embodied either as mechanical-hydraulic control valves or as electrical switches and which are disposed at the entry point of the steering gear. In electrical rotary torque transducers, the signal is usually furnished by means of slip rings, in order to pick up the full functional or adjustment range including several rotations of the steering shaft. A rotary torque transducer incorporated in the tie rod of this kind, because of the necessary level of security, demands very careful and reliable construction, which is therefore expensive.

OBJECT AND SUMMARY OF THE INVENTION

The servo-assisted power steering system disclosed herein has the advantage over the prior art that the linear force transducer can be incorporated into the tie rod without special safety measures being necessary.

In addition, the linear force transducer is to be incorporated into a steering knuckle assembly and an electrical or electronic linear force transducer can be connected to an electrical or electronic control device which is necessary in any case when the vehicle is equipped with a brake anti-lock means, so that velocity information required by the anti-lock means is furnished to the servo-assisted power steering system in such a manner that the power steering is switched on only in the lower range of vehicle velocity. By this means, it is possible to use the power steering particularly as an aid in parking of the motor vehicle.

Furthermore, only small changes must be made in a mechanical steering in order to obtain the proposed auxiliary servo power-assisted steering function as will be more fully explained hereinafter.

The invention will be better understood as well as further objects and advantages thereof become more apparent from the ensuing detailed description of a preferred embodiment taken in conjunction with the drawing.

DESCRIPTION OF THE PREFERRED EMBODIMENT

Figure 1:
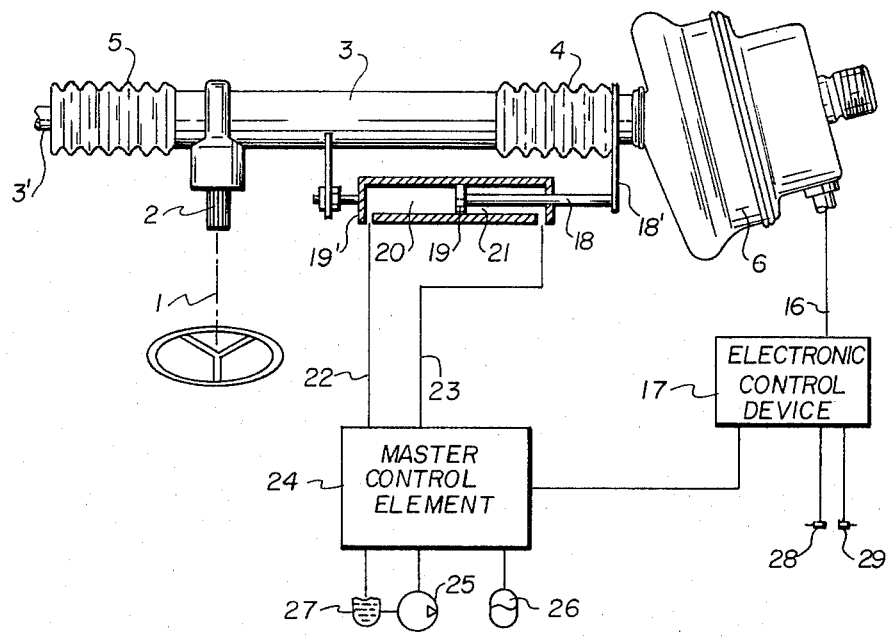
FIG. 1 shows a servo-assisted apparatus for a vehicle steering means.
Figure 2:
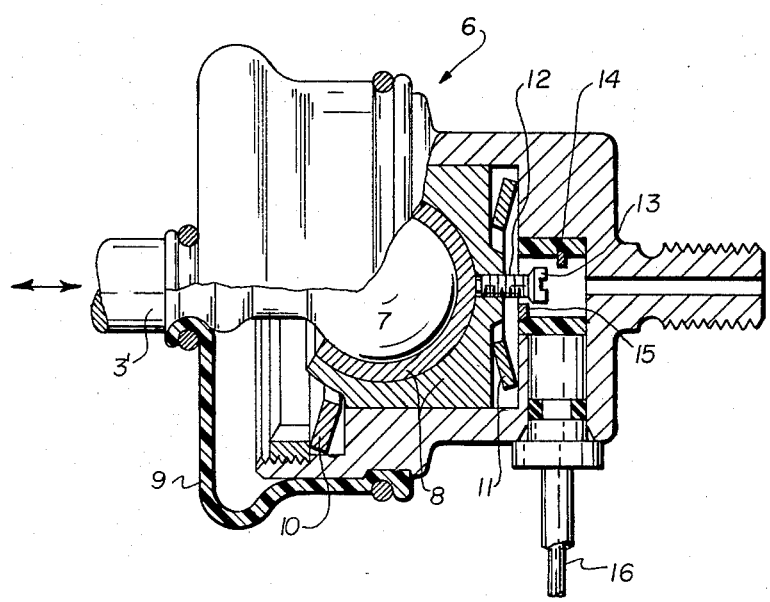
FIG. 2 shows a linear force transducer in a steering knuckle in section.

Turning now to FIG. 1, a power-assisted rack-and-pinion steering assembly includes a pinion 2 disposed on the end of a steering shaft 1, which pinion engages, in a manner not shown, with a rack 3', which is reciprocatably movable within a cylindrical housing 3. On both ends of the housing 3, the rack 3' protrudes outward and these end portions which project from the housing are protected by means of bellows 4 and 5. On the outside, the rack is connected with one steering lever (not shown), one stub axle pivotable about a stub axle bolt and one steered vehicle wheel. At the connection point between the rack 3' and the steering lever, there is a steering knuckle assembly 7, which substantially comprises a ball 7, a cradle 8 therefore and a protective bellows 9 (see FIG. 2). Accordingly, it will be noted that the elements 1-3 together comprise a steering gear and those denoted 6-9 together functions as a tie rod assembly for the servo-assisted steering system.

Contrary to the usual design of a steering knuckle 6, the cradle 8 is not attached to the housing; rather, it is centered by means of two centering springs 10 and 11, embodied as plate springs, which generally simulate Belleville spring elements. A screw 12 is secured with its threaded portion in the body of the cradle 8. The head or cap 13 of the screw is intended as a movable ground contact for cooperation with two contact elements 14 and 15 that are attached to the housing and which are connected via an electrical twin conductor 16 to an electronic control device 17.

A servo cylinder 19' is arranged to extend parallel to the housing 3 and is supported in any preferred manner so that the rack 3' engages a piston rod 18 and a crosspiece 18'. A piston 19, carried by the piston rod 18, is disposed in the servo cylinder 19' and separates two working chambers 20 and 21 from one another. The working chambers 20 and 21 are connected via lines 22 and 23, respectively, to a master control element 24, which is connected to a pump 25, a storage means 26, and to a reservoir 27. The pump 25, storage means 26, reservoir 27 and servo cylinder 19' comprise a servo-assist apparatus of the power steering system.

It is also to be noted that the electronic control device 17, which processes the electrical switching pulses from the contacts in the steering knuckle assembly 6, is also intended for processing switching pulses for a brake anti-lock apparatus as well; in other words, when a vehicle is equipped with an anti-lock apparatus, the signal processing means is already available at no extra cost. Engine speed sensors of an anti-lock apparatus of this kind are indicated by reference numerals 28 and 29.

The described servo-assisted power steering system operates as follows:

The power steering system becomes operative as an aid in parking via the engine speed sensors 28 and 29 furnishing a signal for the power steering only when the vehicle velocity is below 5 km/hr, which is the arbitrary criterion chosen for the vehicular procedure of entering a parking space. When the force in the steering knuckle assembly 6 becomes so great that one or the other of the two centering springs 10 and 11 is compressed, the movable contact 13 is displaced against one or the other of the two stationary contacts 14 or 15. As a result, the steering knuckle 6 acts as a linear electrical switch for closing an electrical current circuit.

The closed electrical current circuit furnishes a signal to the electronic control device 17, and this in turn furnishes a current to the master control element 24, which makes pressurized medium flow from the pressure source 25, 26 to one or the other working chambers 20 or 21 of the servo cylinder 19'. The piston 19 thus reinforces the manual steering force, as appropriate, in the one or the other direction.

If the vehicle is traveling faster than 5 km/hr, then certainly no parking procedure is taking place; thus, the speed sensors do not respond and the servo-assist for the steering does not take effect. In this manner, a simple and inexpensive power steering is provided which is switched on only when required by low speed maneuvers, such as during a parking operation.

It is also possible to equip the steering knuckle assembly with electronic switches, such as Hall-effect or piezoelectric transducers, instead of with contacts 13, 14, 15.

Finally, it is also possible to dispose the linear force transducer in a stub axle, instead of in the steering knuckle assembly.

The foregoing relates to a preferred embodiment of the invention, it being understood that other embodiments and variants thereof are possible within the spirit and scope of the invention, the latter being defined by the appended claims.

What is claimed and desired to be secured by Letters Patent of the United States is:

1. A servo-assisted power steering apparatus and system for motor vehicles comprising
    a steering gear including a steering housing, said steering gear including a rack coupled to a steering knuckle assembly for steering a vehicle,
    a servo apparatus including a servo cylinder and piston therein with the servo cylinder supported from said steering housing and said piston is coupled by a rod and a crosspiece to said rack coupled to said steering knuckle assembly,
    said steering knuckle assembly including an electrical control means,
    a control device for processing signals picked up from said electrical control means and from engine speed sensors for producing an output signal,
    a master control element for controlling the servo apparatus in response to an output signal of the control device, and
    said electrical control means in the steering knuckle assembly having switching values fed to said control device in response to a position of said rack relative to said steering knuckle assembly.

2. A power steering means in accordance with claim 1 wherein said electrical control means includes at least one contact means which is spring loaded to permit movement between another contact means.

3. A power steering means in accordance with claim 1 wherein said control device is connected to engine speed transducers, said engine speed transducers and said control device arranged to monitor said steering gear and said servo apparatus.

4. A power steering means in accordance with claim 1 wherein said electrical control means is responsive to said steering gear.

5. A power steering apparatus as claimed in claim 1 in which:
    said steering knuckle assembly includes a ball secured in a slidable cradle and secured to said rack,
    said slidable cradle including an electrical contact which is movable with said slidable cradle to complete an electrical circuit with said electrical control means corresponding to movement of said rack.

6. A power steering apparatus as claimed in claim 5 in which said cradle is centered in said steering knuckle assembly by use of at least two centering springs which provide a counter force against movement of said cradle due to movement of said rack during steering of said vehicle.

7. A power steering apparatus as claimed in claim 6 in which said cradle movement functions to control said electrical contact means.

8. A power steering apparatus as claimed in claim 1 in which said electrical control means comprises a pair of electrical contacts and a movable grounding contact.

9. A power steering apparatus as claimed in claim 1 in which said electrical control means is a transducer.

10. A power steering apparatus as claimed in claim 9 in which said transducer is a Hall effect transducer.

11. A power steering apparatus as claimed in claim 9 in which said transducer is a piezoelectric transducer.

* * * * *